(No Model.) 2 Sheets—Sheet 1.
F. G. DAVIS.
SPRING VEHICLE.
No. 488,690. Patented Dec. 27, 1892.
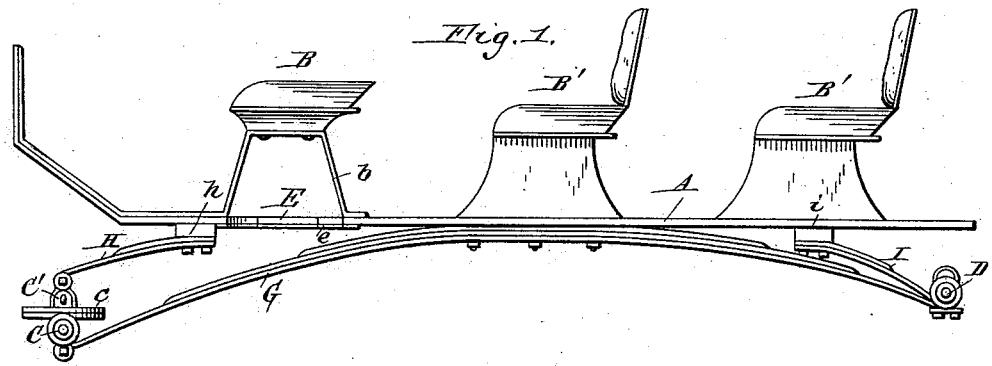
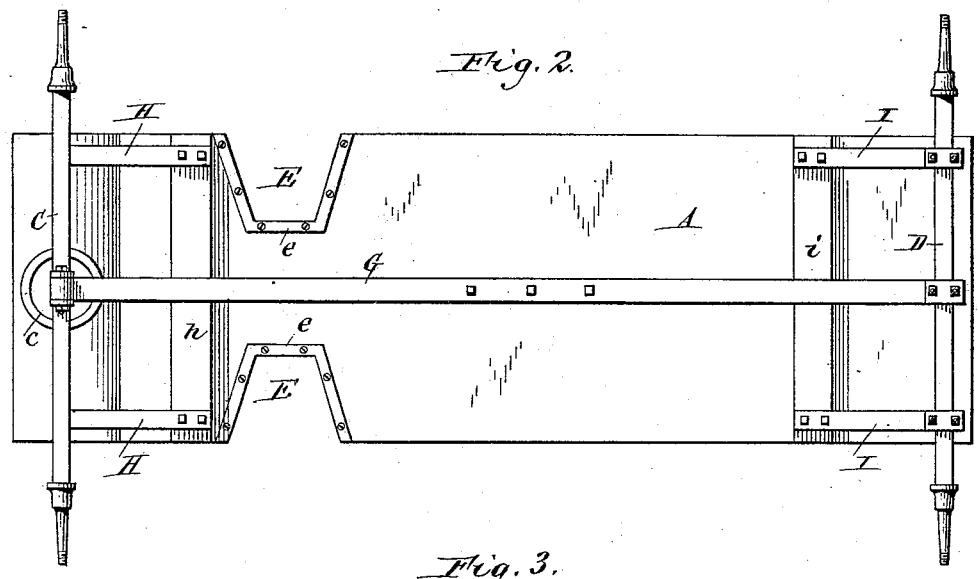
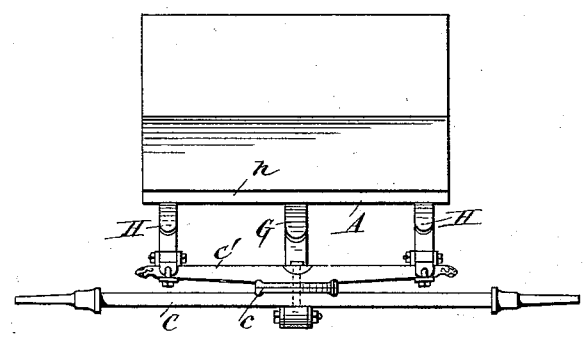
Witnesses:
Emil Neuhart
Theo. L. Popp
Francis G. Davis Inventor.
By Wilhelm & Bonner
Attorneys.

(No Model.) 2 Sheets—Sheet 2.

F. G. DAVIS.
SPRING VEHICLE.

No. 488,690. Patented Dec. 27, 1892.

Witnesses:
Emil Neuhart
Theo. L. Popp

Francis G. Davis Inventor
By Wilhelm & Bonner,
Attorneys.

UNITED STATES PATENT OFFICE.

FRANCIS G. DAVIS, OF WATERTOWN, NEW YORK, ASSIGNOR TO THE H. H. BABCOCK COMPANY, OF SAME PLACE.

SPRING-VEHICLE.

SPECIFICATION forming part of Letters Patent No. 488,690, dated December 27, 1892.

Application filed April 8, 1891. Serial No. 388,154. (No model.)

*To all whom it may concern:*

Be it known that I, FRANCIS G. DAVIS, a citizen of the United States, residing at Watertown, in the county of Jefferson and State of New York, have invented new and useful Improvements in Spring-Vehicles, of which the following is a specification.

This invention relates to that class of vehicles in which a buckboard is used and has the object to produce a strong buckboard vehicle which has an easy motion and which can make a comparatively short turn.

Figure 4:
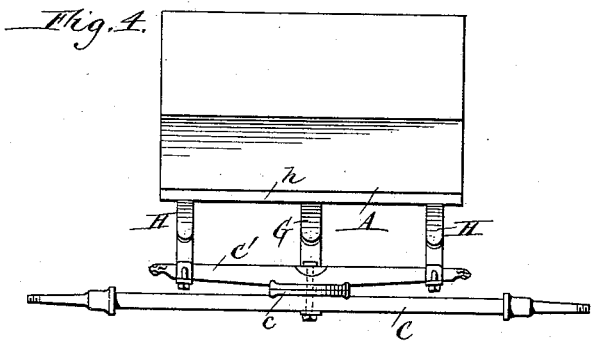
Figure 5:
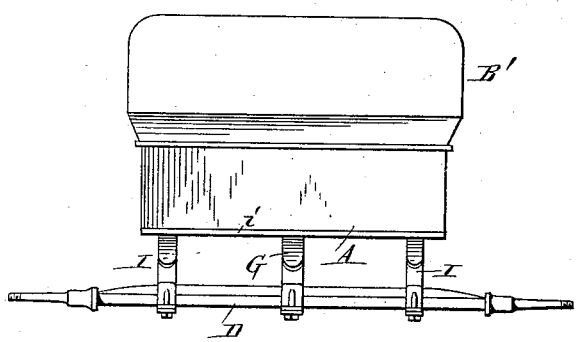
Figure 6:
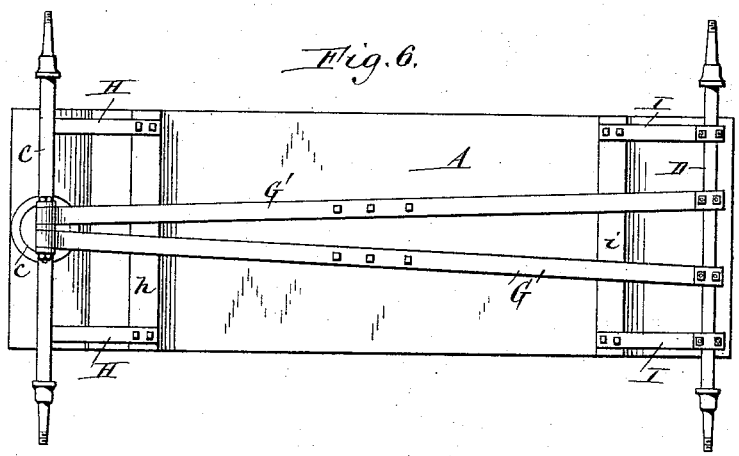

In the accompanying drawings consisting of two sheets, Figure 1 is a side elevation of my improved vehicle with the wheels removed. Fig. 2 is a bottom plan view thereof. Fig. 3 is a front elevation thereof showing the side springs shackled to the front bolster. Fig. 4 is a front elevation showing the side springs clipped to the front bolster. Fig. 5 is a rear elevation of the vehicle. Fig. 6 is a bottom plan view showing two perch springs.

Like letters of reference refer to like parts in the several figures.

A represents the buckboard provided with any desired number of seats B B'.

C represents the front axle, c the fifth wheel, C' the front bolster and D the rear axle.

E represents notches or recesses formed in the sides of the buckboard in rear of the front axle and at such a distance therefrom that the front wheels enter these notches as the front axle is turned, thereby permitting the vehicle to turn short. The edges of these notches are reinforced by metallic straps or braces e which are secured to the under side of the buckboard and which compensate for the material which is removed by forming the notches, so that the strength of the board is not impaired thereby. The standards b of the front seat B are secured to the upper side of the buckboard on the front and rear sides of the notches and extend over the same and form arches which assist in strengthening the notched portions of the board.

G represents a perch spring or reach spring which is secured with its raised middle portion to the underside of the buckboard and with its rear end to the rear axle, while its front end is attached to the king bolt. When the buckboard is very long or designed to carry heavy loads, two forwardly converging perch springs G' may be employed, as represented in Fig. 6.

H represents the front side springs which are arranged underneath the buckboard and near the sides thereof, and which are secured with their rear ends to a cross piece h attached to the underside of the buckboard in front of the notches E. These side springs are attached with their front ends to the front bolster, either by shackles, as represented in Figs. 1 and 3, or by clips, as represented in Fig. 4.

I represents the rear side springs which are secured with their front ends to a cross piece i secured to the underside of the buckboard in front of the rear axle and with their rear ends to the rear axle.

The perch spring ties the front running gear, the buckboard and the rear axle securely together and supports and strengthens the middle portion of the buckboard while it permits of the requisite movement of the buckboard and the front and rear side springs to produce an easy motion of the buckboard.

I claim as my invention:—

The combination with the front and rear axles, of a buckboard having its sides provided with notches or recesses in rear of the front axle, seat standards secured to the sides of the buckboard in front and rear of said notches or recesses and extending over the same, a perch spring secured to the middle portion of the buckboard and extending from the rear axle to the front running gear, rear side springs attached to the rear portion of the buckboard and the rear axle, and front side springs secured to the buckboard in front of said recesses and connected with the front bolster, substantially as set forth.

FRANCIS G. DAVIS.

Witnesses:
JOHN E. FOLEY,
LOUISE SEIPEL.